United States Patent
Ikarashi

(10) Patent No.: US 10,693,886 B2
(45) Date of Patent: Jun. 23, 2020

(54) COMPUTATION SYSTEM, COMPUTATION DEVICE, METHOD THEREOF, AND PROGRAM TO PERFORM INFORMATION PROCESSING

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 221 days.

(21) Appl. No.: 15/746,925

(22) PCT Filed: Aug. 16, 2016

(86) PCT No.: PCT/JP2016/073866
§ 371 (c)(1),
(2) Date: Jan. 23, 2018

(87) PCT Pub. No.: WO2017/030111
PCT Pub. Date: Feb. 23, 2017

(65) Prior Publication Data
US 2019/0141051 A1    May 9, 2019

(30) Foreign Application Priority Data
Aug. 17, 2015 (JP) ................. 2015-160358

(51) Int. Cl.
*H04L 29/06* (2006.01)
*H04L 29/08* (2006.01)
(Continued)

(52) U.S. Cl.
CPC .......... *H04L 63/105* (2013.01); *G06F 9/5005* (2013.01); *G06F 21/64* (2013.01);
(Continued)

(58) Field of Classification Search
CPC ....... H04L 63/10; H04L 63/105; H04L 67/10; H04L 9/08; H04L 9/085; H04L 63/00;
(Continued)

(56) References Cited

U.S. PATENT DOCUMENTS 6,760,746 B1 *   7/2004  Schneider ............... H04L 67/10
                                                    709/203
7,908,524 B2 *   3/2011  Minegishi ........... G06F 11/0709
                                                    714/48
(Continued)

FOREIGN PATENT DOCUMENTS

CN    103400027 A * 11/2013 ............. G06F 19/00
JP    2000-011075 A    1/2000
(Continued)

OTHER PUBLICATIONS

Asynchronous Multiparty Computation: Theory and Implementation Ivan Damgard, Martin Geisler, Mikkel Kroigaard and Jesper Buus Nielsen pp. 21, Jun. 2, 2014.*
(Continued)

*Primary Examiner* — Jeffrey C Pwu
*Assistant Examiner* — Ali H. Cheema
(74) *Attorney, Agent, or Firm* — Oblon, McClelland, Maier & Neustadt, L.L.P.

(57) ABSTRACT

A computation device accepts a first processing request output from a first external device, executes first processing, which does not involve outputting information to a second external device, of processing based on the first processing request until the first processing request is judged to satisfy a predetermined security level, and executes second processing, which involves outputting information to the second external device, of the processing based on the processing request after the first processing request is judged to satisfy the security level.

9 Claims, 6 Drawing Sheets

(51) Int. Cl.
*H04L 9/08* (2006.01)
*G06F 9/50* (2006.01)
*G06F 21/64* (2013.01)
*G06F 21/53* (2013.01)
*G06F 21/62* (2013.01)
*G06Q 20/34* (2012.01)
*G06F 21/55* (2013.01)
*G06K 15/00* (2006.01)

(52) U.S. Cl.
CPC .............. *H04L 9/085* (2013.01); *H04L 63/00* (2013.01); *H04L 63/20* (2013.01); *H04L 67/10* (2013.01); *G06F 21/53* (2013.01); *G06F 21/552* (2013.01); *G06F 21/62* (2013.01); *G06K 15/4095* (2013.01); *G06Q 20/352* (2013.01); *H04L 2209/46* (2013.01)

(58) Field of Classification Search
CPC ... H04L 63/20; H04L 2209/46; H04L 41/082; G06F 9/50; G06F 9/5005; G06F 21/64; G06F 13/00; G06F 11/0709; G06F 19/00; G06F 21/53; G06F 21/62; G06F 21/552; G06K 15/4095; G06Q 20/352
USPC ......... 726/1, 4, 26, 22, 27; 714/48; 708/250; 704/246; 709/203; 358/1.14, 1.15
See application file for complete search history.

(56) References Cited

U.S. PATENT DOCUMENTS

| | | | | |
|---|---|---|---|---|
| 2002/0161454 | A1* | 10/2002 | Mukai | H04W 88/02 700/12 |
| 2005/0004952 | A1 | 1/2005 | Suzuki et al. | |
| 2007/0039059 | A1* | 2/2007 | Andoh | G06F 21/62 726/27 |
| 2008/0022401 | A1* | 1/2008 | Cameron | G06F 21/552 726/22 |
| 2009/0128852 | A1* | 5/2009 | Fujishita | H04L 41/082 358/1.15 |
| 2013/0055340 | A1* | 2/2013 | Kanai | G06F 21/53 726/1 |
| 2013/0304780 | A1* | 11/2013 | Ikarashi | H04L 9/085 708/250 |
| 2014/0259100 | A1* | 9/2014 | Li | H04L 63/20 726/1 |
| 2015/0116752 | A1* | 4/2015 | Suzuki | G06K 15/4095 358/1.14 |
| 2015/0142438 | A1* | 5/2015 | Dai | G10L 17/22 704/246 |
| 2015/0256532 | A1* | 9/2015 | Funayama | H04L 63/102 726/4 |
| 2015/0278547 | A1* | 10/2015 | Kawamoto | H04L 9/085 726/26 |
| 2015/0358155 | A1 | 12/2015 | Ikarashi et al. | |
| 2016/0205131 | A1* | 7/2016 | Dahmouni | G06Q 20/352 726/22 |

FOREIGN PATENT DOCUMENTS

JP 2005-025432 A 1/2005
WO WO 2014/112548 A1 7/2014

OTHER PUBLICATIONS

High-performance secure multi-party computation for data mining applications, Dan Bogdanov, Margus Niitsoo, Tomas Toft, Jan Willemson, pp. 16, vol. 11, Issue 6, Nov. 2012.*
Extended European Search Report dated Nov. 16. 2018 in European Patent Application No. 16837100.3, 10 pages.
Damgard. I., et al., "Asynchronous Multiparty Computation: Theory and Implementation", Medical Image Computing and Computer-Assisted Intervention—MICCAI 2015: 18th International Conference, XP047422972, Oct. 5-9, 2015, pp. 160-179.
International Search Report dated Oct. 11, 2016, in PCT/JP2016/073866 filed Aug. 16, 2016.
Japanese Office Action dated Jul. 26, 2016, in Japanese Application 2015-160358 (with unedited computer-generated English translation).
Koji Chida et al., "A Three-Party Secure Function Evaluation with Lightweight Verifiability Revisited", CSS2010, Mar. 2010, 6 pages.
Ronald Cramer et al., "Share Conversion, Pseudorandom Secret-Sharing and Applications to Secure Computation", TCC, vol. 3378 of Lecture Notes in Computer Science, 2005, 21 pages.
Rosario Gennaro et al., "Simplified VSS and Fast-track Multiparty Computations with Applications to Threshold Cryptography", PODC, ACM, 1998, 11 pages.
Ivan Damgard et al., "Scalable and Unconditionally Secure Multiparty Computation", CRYPTO, vol. 4622 of Lecture Notes in Computer Science, Springer, 2007, 19 pages.
Koki Hamada et al., "A Random Permutation Protocol on Three-Party Secure Function Evaluation", CSS2010, 2010, 6 pages.

* cited by examiner

COMPUTATION SYSTEM, COMPUTATION DEVICE, METHOD THEREOF, AND PROGRAM TO PERFORM INFORMATION PROCESSING

TECHNICAL FIELD

The present invention relates to an information security technology and, in particular, relates to a technology to perform information processing by a plurality of devices.

BACKGROUND ART

A technology (for example, distributed computation by cloud computing) to perform information processing by a plurality of devices is known (see, for example, Non-patent Literature 1).

PRIOR ART LITERATURE

Non-Patent Literature

Non-patent Literature 1: Koji Chida, Koki Hamada, Dai Ikarashi, Katsumi Takahashi, "A Three-party Secure Function Evaluation with Lightweight Verifiability Revisited", CSS2010, 2010.

SUMMARY OF THE INVENTION

Problems to be Solved by the Invention

In such a technology, if improper information is passed between the devices, processing or the result thereof may become incorrect or the information may leak. On the other hand, if processing is stopped until it is confirmed that the information passed between the devices is proper, the processing speed is reduced.

An object of the present invention is to perform information processing by a plurality of devices at high speed and securely.

Means to Solve the Problems

A computation device accepts a processing request, executes first processing, which does not involve outputting information to an external device, of processing based on the processing request until the processing request is judged to satisfy a predetermined security level, and executes second processing, which involves outputting information to the external device, of the processing based on the processing request after the processing request is judged to satisfy the security level.

Effects of the Invention

As a result, it is possible to perform information processing by a plurality of devices at high speed and securely.

DETAILED DESCRIPTION OF THE EMBODIMENTS

Hereinafter, embodiments of the present invention will be described with reference to the drawings.

First Embodiment

Figure 1:
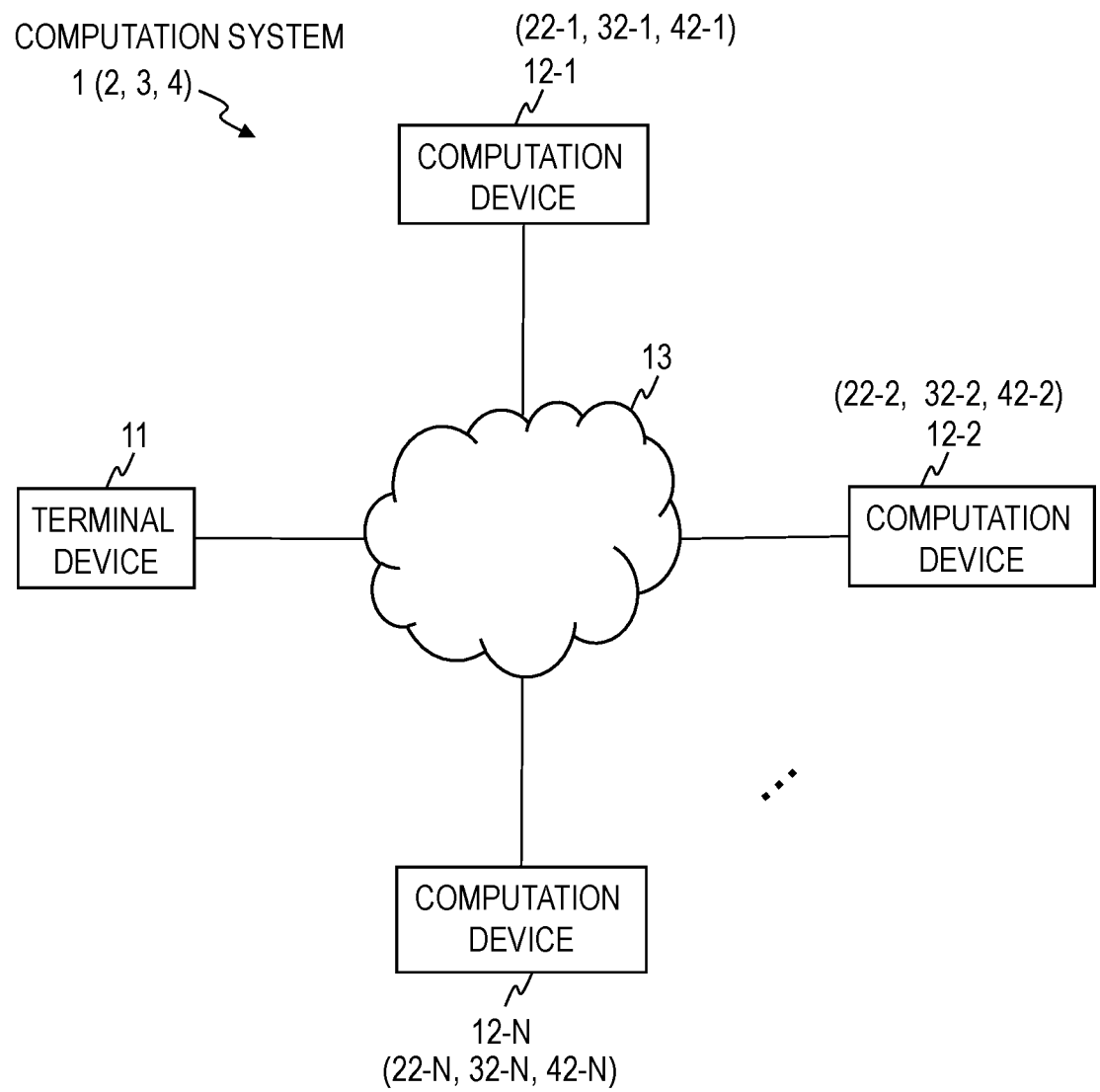
FIG. 1 is a block diagram illustrating the configuration of a computation system of an embodiment.
Figure 2:
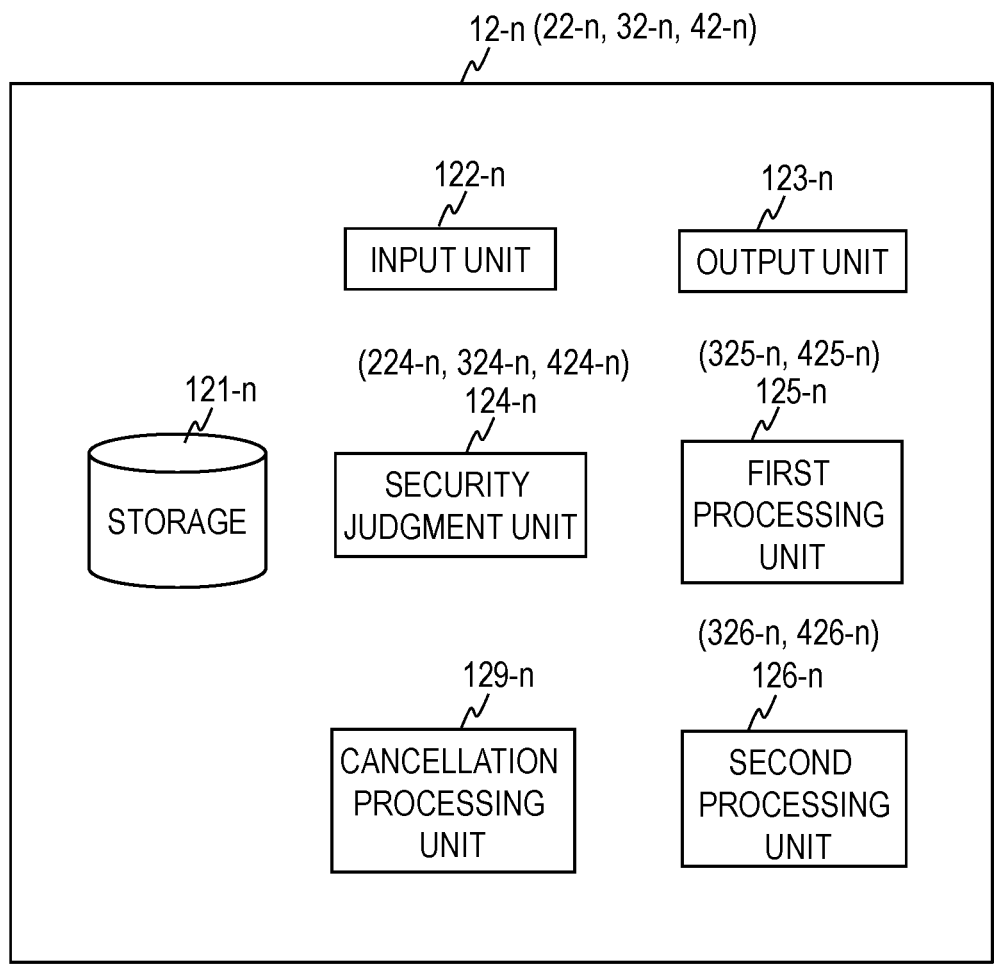
FIG. 2 is a block diagram illustrating the configuration of a computation device of the embodiment.

First, a first embodiment will be described.
<Configuration>
As illustrated in FIG. 1, a computation system 1 of the present embodiment includes a terminal device 11 and N computation devices 12-1 to 12-N, which are configured so as to be capable of communicating with each other via a network 13 which is not secure. Here, N is an integer greater than or equal to 2. As illustrated in FIG. 2, a computation device 12-$n$ ($n \in \{1, \ldots, N\}$) of the present embodiment includes a storage 121-$n$, an input unit 122-$n$, an output unit 123-$n$, a security judgment unit 124-$n$, a first processing unit 125-$n$, a second processing unit 126-$n$, and a cancellation processing unit 129-$n$. Each device is configured as a result of, for example, a general-purpose or dedicated computer including a communication device, a processor (a hardware processor) such as a central processing unit (CPU), memory such as random-access memory (RAM) and read-only memory (ROM), and so forth executing a predetermined program. This computer may include one processor or memory or more than one processor or memory. This program may be installed in the computer or may be recorded on the ROM or the like in advance. Moreover, part or all of the processing units may be configured by using not an electronic circuit (circuitry), like a CPU, which implements a functional configuration as a result of a program being read thereinto but an electronic circuit that implements a processing function without using a program. An electronic circuit with which one device is configured may include a plurality of CPUs.
<Processing>
In the present embodiment, the terminal device 11 outputs a query which requests processing in accordance with an encryption protocol of secure computation or the like, and the computation devices 12-1 to 12-N perform parallel asynchronous processing in response to this request. A computation device 12-$i$ ($i \in \{1, \ldots, N\}$) which has received the query executes processing based on the query (processing request) and, when necessary, sends a message to another computation device 12-$j$ ($j \in \{1, \ldots, N\}$). The computation device 12-$j$ which has received the message (processing request) executes processing based on the message. That is, each computation device 12-$n$ ($n \in \{1, \ldots, N\}$) executes each processing by being triggered by an input of the query or message. The following measures are taken on the assumption that falsification may be made between the computation devices 12-1 to 12-N.

Figure 3:
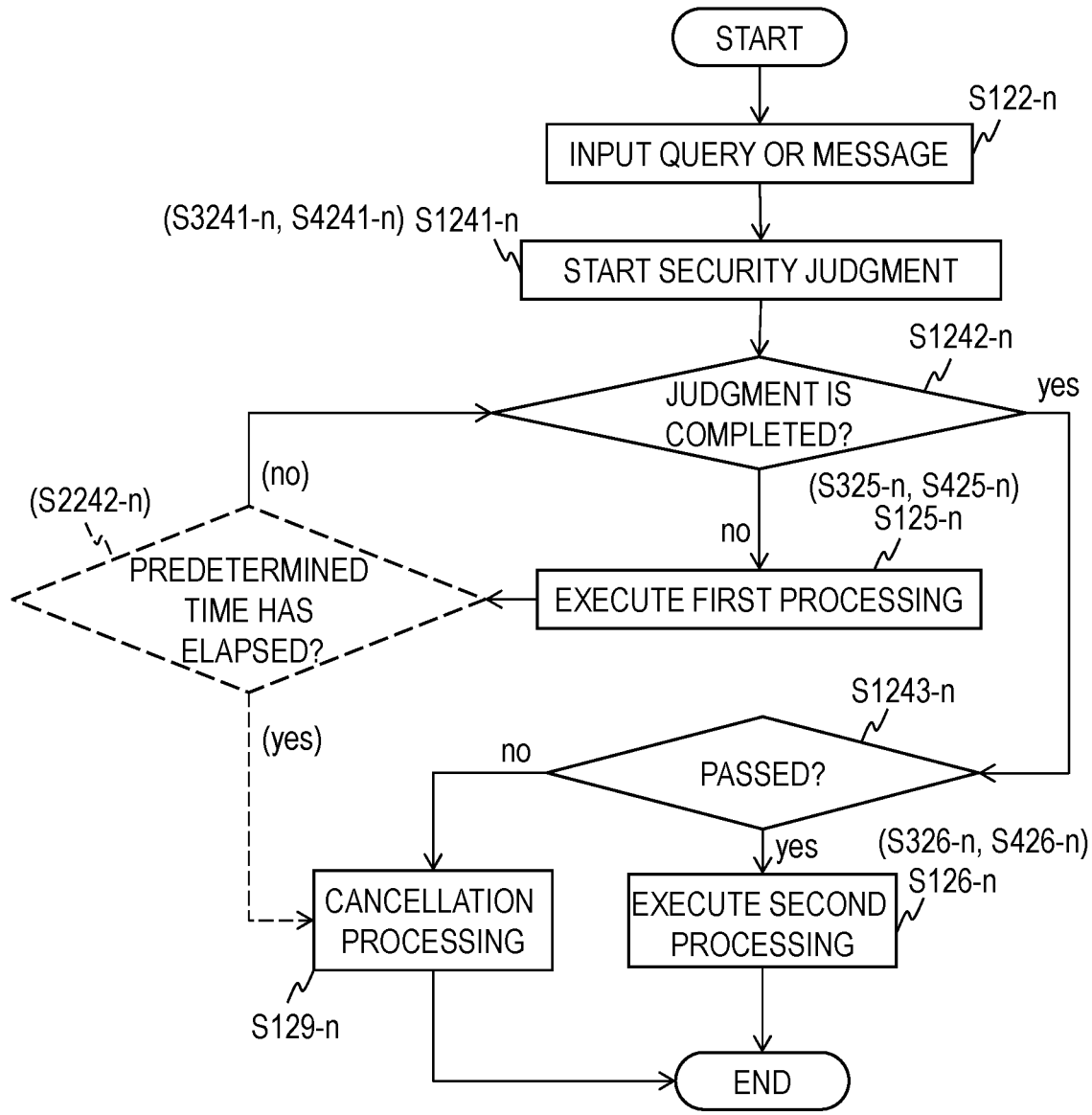
FIG. 3 is a flow diagram illustrating a computation method of the embodiment.

As illustrated in FIG. 3, the query or message is input to the input unit 122-$n$ of the computation device 12-$n$ (FIG. 2) (the input unit 122-$n$ accepts a processing request output from a "first external device") and is stored in the storage 121-$n$ (Step S122-$n$). The "first external device" is the terminal device 11 or any computation device 12-$m'$ ($m' \in$ {1, . . . , N} and m' n). By being triggered thereby, the security judgment unit 124-$n$ starts a security judgment as to whether or not the input query or message satisfies a predetermined security level. A method for judging whether or not the query or message satisfies a predetermined security level is not limited to a particular method. For example, "the query or message satisfies a predetermined security level" may mean that the query or message is a query or message that has been sent from a reliable device (the terminal device 11 or the computation device 12-$n$), correctness of the query or message is verified based on a Byzantine agreement algorithm or the like, or the query or message is a query or message that is based on processing on which devices whose number is a predetermined number or more have reached an agreement. Moreover, "the message satisfies a predetermined security level" may mean that the message is a correct message about a reliable query. This security judgment may be performed by local processing which does not involve communication, such as verifying an electronic signature affixed to the query or message, or by processing involving communication, such as the Byzantine agreement algorithm (Step S1241-$n$).

The security judgment unit 124-$n$ performs monitoring to determine whether the security judgment is completed (Step S1242-$n$). The first processing unit 125-$n$ executes only "first processing", which does not involve outputting information to a "second external device", of processing based on the query or message (processing which is performed by being triggered by the query or message) until it is judged that the security judgment is completed and the query or message satisfies the predetermined security level. The "second external device" is the terminal device 11 or any computation device 12-$m'$ ($m' \in \{1, \ldots, N\}$ and m' n). The "second external device" may be different from the "first external device" or may be the same as the "first external device". Processing involving which outputs information (for example, an output of a message or calculation result) to the "second external device" is not executed until the query or message is judged to satisfy the predetermined security level. Examples of the "first processing" are local processing, which does not involve communication, of processing based on the query or message (for example, secure computation processing, encryption processing, decoding processing, signature generation processing, key exchange processing, or the like), processing to store "storage information" based on the query or message in the storage 121-$n$, and so forth. The "storage information" may be the query or message itself, information corresponding thereto, a calculation result or error result (information indicating the occurrence of an error) obtained by local processing based on the query or message, information corresponding to the calculation result or error result, or a message that is sent to the "second external device" (Step S125-$n$).

After the security judgment unit 124-$n$ judges that the security judgment is completed and the query or message satisfies the predetermined security level (Step S1243-$n$), the second processing unit 126-$n$ executes "second processing", which involves outputting information (a message or processing result) to the "second external device", of the processing based on the query or message. An example of the "second processing" is processing based on the "storage information" stored in the storage 121-$n$ in the "first processing". For instance, the "second processing" may be processing by which the "storage information" or the calculation result based thereon is sent to the "second external device" or processing by which the other calculation result, an error result, or a message is sent to the "second external device". Moreover, if an error occurs in the "first processing", since the error may be caused by falsification, internal processing (for example, the "first processing") in the computation device 12-$n$ based on the query or message input in Step S122-$n$ may be cancelled, and the "second processing" which outputs a message (a second processing request) which requests cancellation of all the "external processing" corresponding to the query or message may be executed. Here, the "external processing" means processing executed in any "external device" (for instance, the "first external device"). The "external device" is the terminal device 11 or any computation device 12-$m'$ ($m' \in \{1, \ldots, N\}$ and m'≠n). For example, if a message is input to the input unit 122-$n$ in Step S122-$n$ and the message (the processing request) is derived from any one of the "external processing" based on a query (a processing start request), the "second processing" may be executed by which a message which requests cancellation of all of these "external processing" is output. The "external processing" based on a query means processing $P_1$ performed by the "external device", to which the query was input, based on the query, and processing $P_{w+1}$ (w is an integer greater than or equal to 1) performed by the "external device", to which a message output based on the processing $P_w$ was input, based on the message. The "second processing" by which a message which requests cancellation of all the "external processing" corresponding to the query or message input to the input unit 122-$n$ is output may be executed by any other trigger. The output unit 123-$n$ sends the message, calculation result, or the like, which output in the "second processing", to any "external device" (Step S126-$n$).

On the other hand, if the security judgment unit 124-$n$ judges that the query or message does not satisfy the predetermined security level, the cancellation processing unit 129-$n$ cancels the internal processing (for example, the "first processing") in the computation device 12-$n$ based on the query or message input in Step S122-$n$ (cancellation processing). In this case, the "storage information" stored in the storage 121-$n$ may be deleted or a message indicating an error may be output. This message is sent to any "external device" from the output unit 123-$n$. Moreover, if the message (the processing request) derived from any one of the "external processing" based on the query (the processing start request) is judged not to satisfy the above-described security level, the cancellation processing unit 129-$n$ may output a message (a second processing request) which requests cancellation of all the "external processing". This message is sent from the output unit 123-$n$ to the "external device" that executed the "external processing" (Step S129-$n$).

Example 1 of Overall Processing

Figure 4:
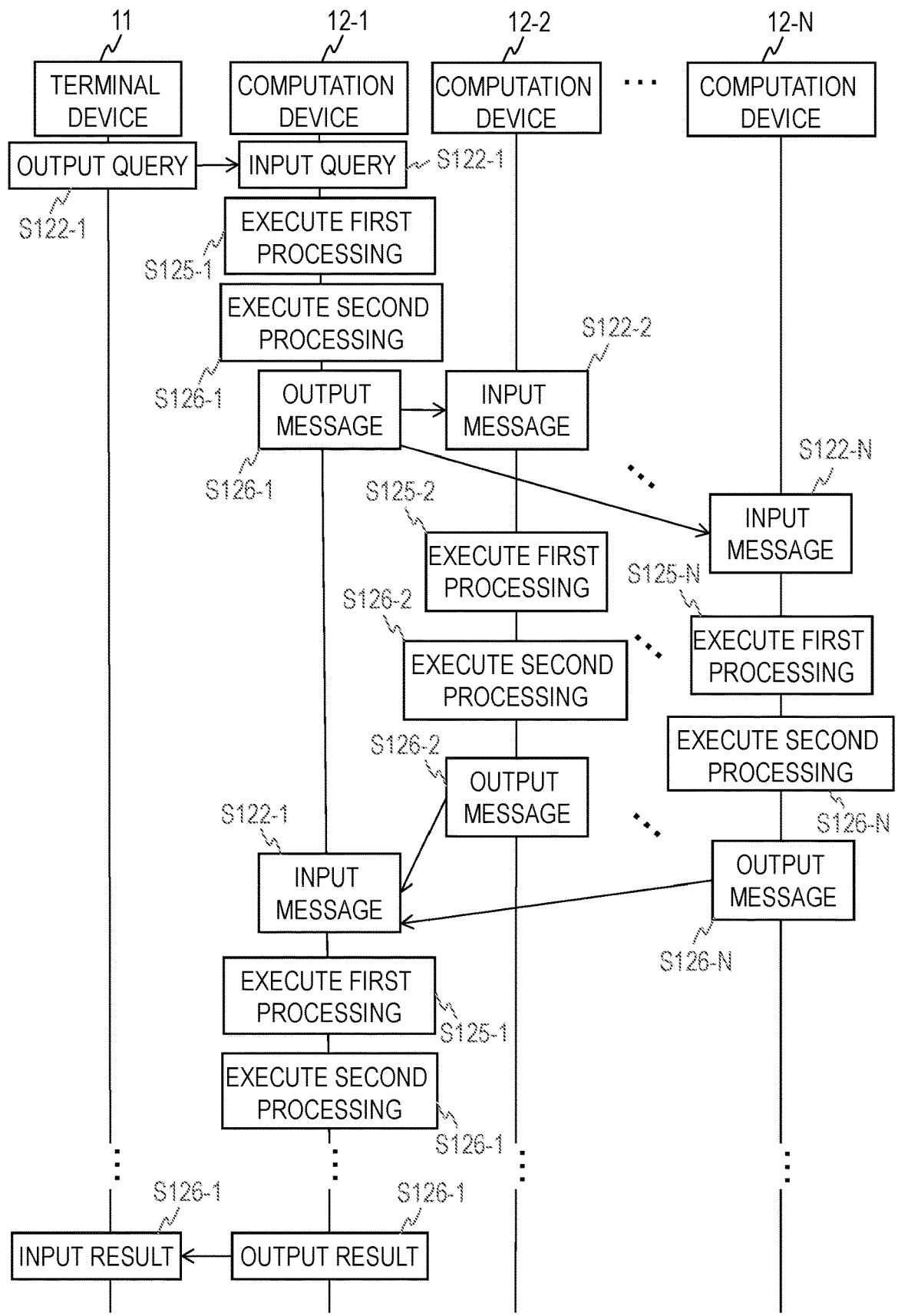
FIG. 4 is a sequence diagram for illustrating processing of the embodiment.

In an example of FIG. 4, the query output from the terminal device 11 is input to the computation device 12-1 (FIG. 3: Step S122-1). The computation device 12-1 executes only the "first processing", which does not involve processing which outputs information to the "second external device", of the processing based on the query until the query is judged to satisfy the security level (Step S125-1), and, after the query is judged to satisfy the security level, the computation device 12-1 executes the "second processing", which involves processing which outputs information to the "second external device", of the processing based on the query (Step S126-1). Based on the "second processing" in Step S126-1, a message is sent to the computation devices 12-2 to 12-N from the computation device 12-1 and input to a computation device 12-$z$ ($z \in \{2, \ldots, N\}$) (Step S122-$z$). The computation device 12-$z$ executes the "first processing", which does not involve processing which outputs information to the "second external device", of the processing based on the message until the message is judged to satisfy the security level (Step S125-$z$), and, after the message is judged to satisfy the security level, the computation device 12-$z$ executes the "second processing", which involves processing which outputs information to the "second external device", of the processing based on the message (Step S126-$z$). Based on the "second processing" in Step S126-$z$, a message is sent to any computation device 12-$y$ ($y \in \{1, \ldots, N\}$ and $y \neq z$) from the computation device 12-$z$. Then, similar processing is performed, the computation device 12-1 outputs the result of the processing, and the result is input to the terminal device 11.

Example 2 of Overall Processing

Figure 5:
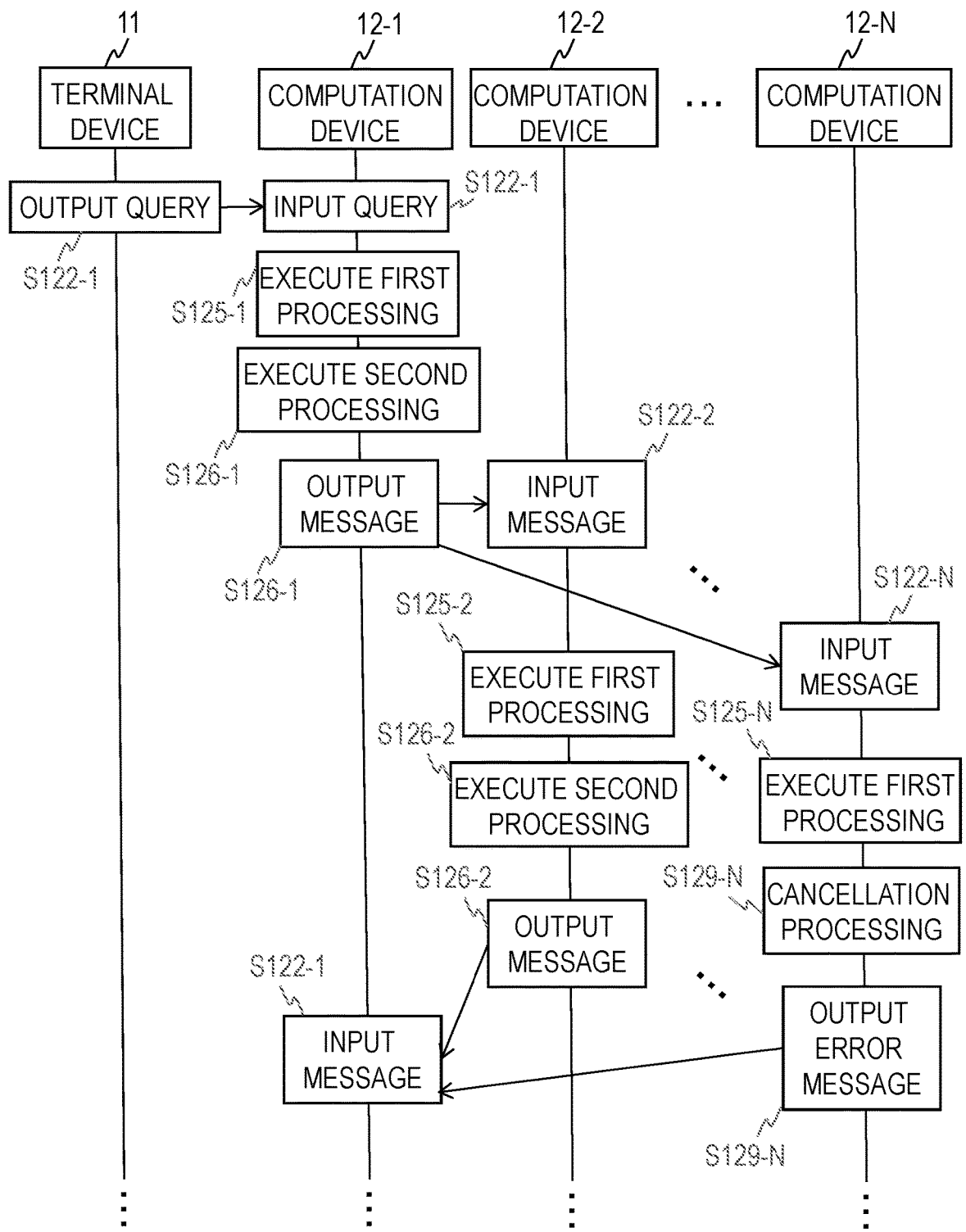
FIG. 5 is a sequence diagram for illustrating processing of the embodiment.

In an example of FIG. 5, as is the case with those described above, a message is input to the computation device 12-N (Step S122-N), and only the "first processing", which does not involve processing which outputs information to the "second external device", of the processing based on the message is executed until the message is judged to satisfy the security level (Step S125-N). However, the message is then judged not to satisfy the security level, the cancellation processing to cancel the "first processing" in the computation device 12-N is executed, and an error message is sent to the computation device 12-1.

Example 3 of Overall Processing

Figure 6:
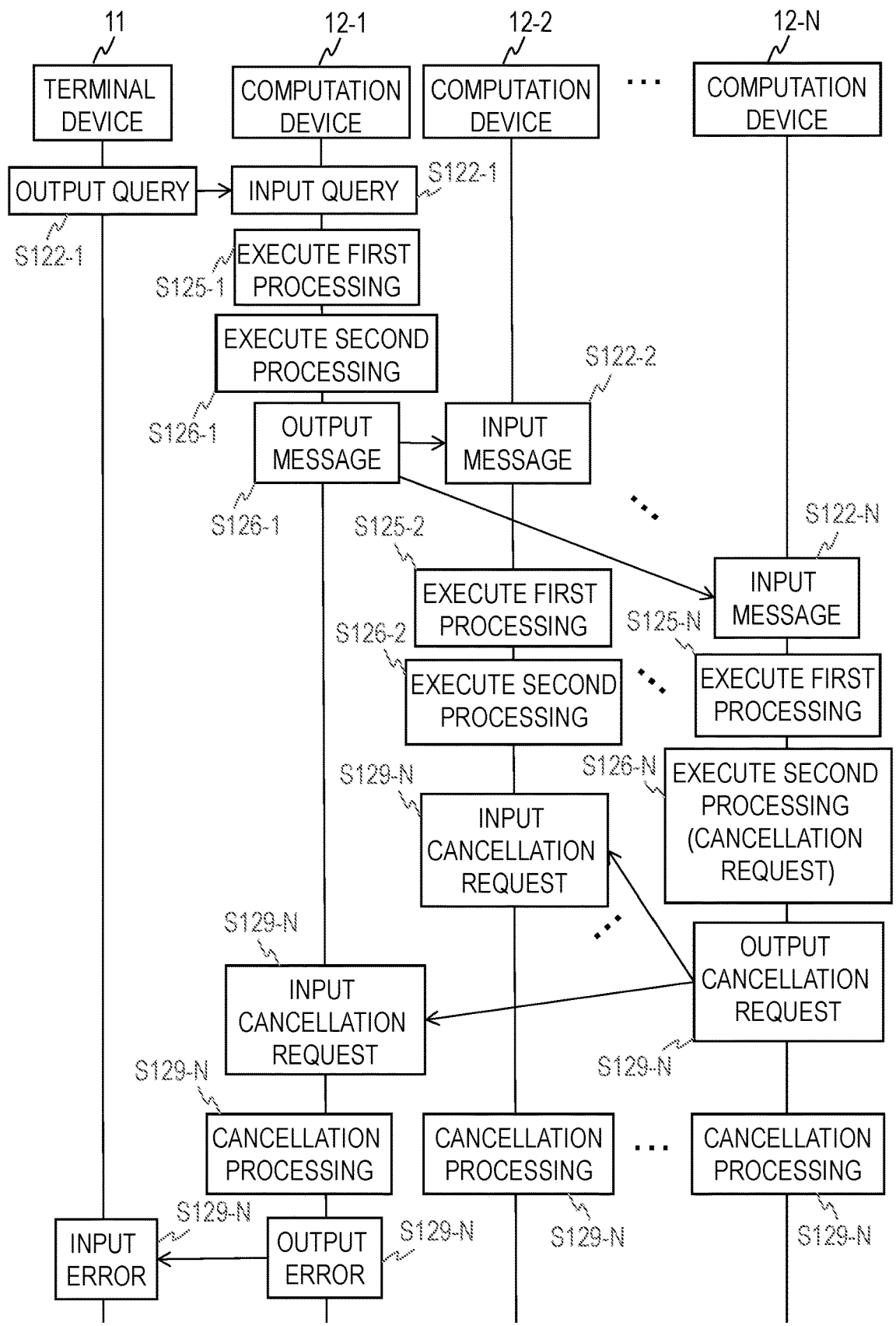
FIG. 6 is a sequence diagram for illustrating processing of the embodiment.

In an example of FIG. 6, as is the case with those described above, a message is input to the computation device 12-N(Step S122-N), and only the "first processing", which does not involve processing which outputs information to the "second external device", of the processing based on the message is executed until the message is judged to satisfy the security level (Step S125-N). Assume that an error occurs in this "first processing". Then, after the message is judged to satisfy the security level, the computation device 12-N executes the "second processing" by which a message which requests cancellation of all the "external processing" based on the query output from the terminal device 11 is output. The computation device 12-N executes cancellation of the internal processing, and the computation devices 12-1 to 12-(N−1) execute cancellation of their respective internal processing based on the message which requests cancellation.

Example 4 of Overall Processing

Alternatively, in the example of FIG. 6, a message is input to the computation device 12-N(Step S122-N) and only the "first processing", which does not involve processing which outputs information to the "second external device", of the processing based on the message is executed until the message is judged to satisfy the security level (Step S125-N). Assume that no error occurs in this "first processing". Then, if the message is judged not to satisfy the security level, the second processing is not executed, and the computation device 12-N outputs a message which requests cancellation of all the "external processing" based on the query output from the terminal device 11 (Step S129-N). The computation device 12-N executes cancellation of the internal processing, and the computation devices 12-1 to 12-(N−1) execute cancellation of their respective internal processing based on the message which requests cancellation.

Feature of the Present Embodiment

In the present embodiment, the "second processing" which involves outputting information to the "second external device" is not executed until the query or message is judged to satisfy the predetermined security level. As a result, even when the query or message is improper, a message or the like based on incorrect processing performed by being triggered thereby is not sent to the "second external device". This makes it possible to prevent the influence based on the improper query or message from spreading. On the other hand, the "first processing" which does not involve outputting information to the "second external device" is executed until the query or message is judged to satisfy the above-described security level. This makes it possible to carry on the processing without allowing the influence based on the improper query or message to spread to the "second external device" and thereby suppress a processing delay which would be caused by the above-described judgment. That is, it is possible to provide the earliest possible processing start timing within the secure bounds of not allowing the influence based on the improper query or message to spread. This makes it possible to perform information processing by a plurality of devices at high speed and securely.

Even when the input query or message is judged to satisfy the above-described security level, an error sometimes occurs in the "first processing". In this case, in spite of the fact that improperness of the input query or message cannot be found, there is a possibility that the "external processing" corresponding to the query or message has been improper. On the other hand, in spite of the fact that the "external processing" is proper, an error sometimes occurs in the "first processing" because the query or message which triggered the "first processing" is improper. For instance, there is a possibility that an improper query or message has been input in order to cancel proper "external processing" (for example, processing of the "first external device") on purpose. Some final results sometimes can be obtained by only the "external processing". For this reason, in the present embodiment, even when an error has occurred in the "first processing", a message (a second processing request) which requests cancellation of the "external processing" (for example, the processing performed by the first external device) corresponding to a query or message is not sent to the "external device" (for example, the "first external device") until the query or message (the first processing request) input to the input unit 122-$n$ is judged to satisfy the above-described security level. That is, even when an error has occurred in the "first processing", the cancellation processing unit 129-$n$ does not output the "second processing request" which requests cancellation of the processing performed by the "external device" (for example, the "first external device") until the "first processing request" is judged to satisfy a first security level and, after an error occurs in the "first processing" and the "first processing request" is judged to satisfy the "first security level", outputs the "second processing request" to the "external device" (for example, the "first external device"). In other words, even when an error has occurred in the "first processing", if the query or message (the first processing request) input to the input unit 122-$n$ is judged not to satisfy the above-described security level, the cancellation processing unit 129-$n$ does not output a message (a second processing request) which requests cancellation of the "external processing" (for example, the processing performed by the first external device). This makes it possible to prevent the "external processing" from being improperly cancelled by an improper query or message. On the other hand, after the query or message is judged to satisfy the above-described security level, cancellation of all the "external processing" corresponding to the query or message which triggered the "first processing" in which the error has occurred is requested (the second processing). As a result, it is possible to cancel the "external processing" which may include improper processing with the earliest possible timing with which it is confirmed that the request is not an improper cancellation request.

If the query or message input to the "external device" is erroneously judged to satisfy the above-described security level or a false judgment is made that the query or message satisfies the above-described security level, an improper message is sometimes input to the computation device $12\text{-}n$ from the "external device". When a judgment is made that the message input to the computation device $12\text{-}n$ does not satisfy the above-described security level, cancellation of all the "external processing" corresponding to such a message is performed, whereby it is possible to cancel the processing of such an "external device".

Second Embodiment

The present embodiment is a modification of the first embodiment, and "second processing" is executed when a query or message is judged to satisfy a security level before a predetermined time elapses. Hereinafter, a difference from the already-explained matter will be mainly described, and a description of a matter which is also found in the already-explained matter will be simplified by using the already-used reference character.

<Configuration>

As illustrated in FIG. 1, a computation system 2 of the present embodiment includes a terminal device 11 and N computation devices 22-1 to 22-N, which are configured so as to be capable of communicating with each other via a network 13 which is not secure. As illustrated in FIG. 2, a computation device $22\text{-}n$ ($n \in \{1, \ldots, N\}$) of the present embodiment includes a storage $121\text{-}n$, an input unit $122\text{-}n$, an output unit $123\text{-}n$, a security judgment unit $224\text{-}n$, a first processing unit $125\text{-}n$, a second processing unit $126\text{-}n$, and a cancellation processing unit $129\text{-}n$.

<Processing>

As illustrated in FIG. 3, Steps $S122\text{-}n$ and $S1241\text{-}n$ described in the first embodiment are executed, and the security judgment unit $224\text{-}n$ performs monitoring to determine whether the security judgment is completed and whether a predetermined time has elapsed (Steps $S1242\text{-}n$ and $S2242\text{-}n$). The first processing unit $125\text{-}n$ executes only "first processing", which does not involve outputting information to a "second external device", of processing based on the query or message until the predetermined time is judged to have elapsed or it is judged that the security judgment is completed and the query or message satisfies a predetermined security level (Step $S125\text{-}n$).

If the security judgment unit $224\text{-}n$ judges that the security judgment is completed and the query or message satisfies the above-described security level before the predetermined time elapses (Step $S1242\text{-}n$, Step $S1243\text{-}n$), the "second processing" described in the first embodiment is executed (Step $S126\text{-}n$). On the other hand, if the predetermined time is judged to have elapsed (Step $S2242\text{-}n$) or it is judged that the security judgment is completed and the query or message does not satisfy the predetermined security level before the predetermined time elapses (Step $S1242\text{-}n$, Step $S1243\text{-}n$), the "cancellation processing" described in the first embodiment is executed (Step $S129\text{-}n$).

Feature of the Present Embodiment

In the present embodiment, the "cancellation processing" is also executed if the security judgment is not completed before the predetermined time elapses. This makes it possible to avoid a situation in which the security judgment is performed for a lengthy period due to an improper query or message and the processing is delayed accordingly. On the other hand, the "first processing" is executed until the predetermined time is judged to have elapsed or it is judged that the security judgment is completed and the query or message satisfies the predetermined security level. If the query or message is judged to satisfy the security level before the predetermined time elapses, the "second processing" is executed. This makes it possible to perform information processing by a plurality of devices at high speed and securely.

Third Embodiment

A third embodiment will be described. "First processing" of the present embodiment includes processing by which, by using a concealed value $[r]$ of a random number r and a concealed value $[f_i]$ of a function value $f_i$ of operand information (an operand), a concealed value $[f_i r]$ of a product $f_i r$ of the function value $f_i$ and the random number r is obtained and a checksum $C := \langle f_0 \rangle, \ldots, \langle f_{\mu-1} \rangle$ including a randomized concealed value $\langle f_i \rangle$ obtained by pairing the concealed value $[f_i]$ with the concealed value $[f_i r]$ is obtained. "Second processing" includes processing by which the checksum C is verified based on a concealed value $[\varphi]$ obtained by multiplying the sum of the values of the concealed value $[f_i]$ by the concealed value $[r]$ and a concealed value $[\psi]$ which is the sum of the values of the concealed value $[f_i r]$ included in the checksum C. Here, $\mu$ is an integer greater than or equal to 1, i is an integer which satisfies $0 \le i < \mu$, and the "concealed value" means a secret concealed value in accordance with a secret sharing scheme.

A value which is handled in the present embodiment is assumed to be a value over R unless otherwise specified. R is a ring. A is an associative algebra over R. The associative algebra is what is an associative ring and has a structure of a linear space over some field which is compatible therewith. The associative algebra can be described as what is obtained by using a ring, not a field, as a value which is handled in a vector space.

The i-th element of a vector X is indicated by $X_i$ (a subscript).

$[x]$ is a concealed value of a value $x \in R$. The concealed value may be a shared value (a secret sharing value) obtained by concealing a value in accordance with the secret sharing scheme or cipher text obtained by encrypting a value in accordance with a homomorphic crypto system. If X is a set, $[X]$ is a set obtained by concealing each element of the set X.

$|X|$ is the number of elements of the set X.

$\langle x \rangle$ is a randomized concealed value of a value $x \in R$. The randomized concealed value is a pair of the concealed value $[x]$ and a concealed value $[xr]$ of a product xr of the value x and a random number $r \in A$. Thus, the randomized concealed value can be defined as in the following formula (1).

$$\langle x \rangle := ([x], [xr]) \in [R] \times [A] \qquad (1)$$

A zeroth component ([x] in the formula (1)) of the randomized concealed value is also referred to as an R component and a first component ([xr] in the formula (1)) is also referred to as an A component.

A space of the randomized concealed value whose parameter is the random number $r \in A$ is assumed to be $<Rr>$.

It is to be noted that (left side):=(right side) means that the (right side) is defined as the value of the (left side).

<Configuration>

As illustrated in FIG. 1, a computation system 3 of the present embodiment includes a terminal device 11 and N computation devices 32-1 to 32-N, which are configured so as to be capable of communicating with each other via a network 13 which is not secure. Here, N is an integer greater than or equal to 2. As illustrated in FIG. 2, a computation device 32-$n$ ($n \in \{1, \ldots, N\}$) of the present embodiment includes a storage 121-$n$, an input unit 122-$n$, an output unit 123-$n$, a security judgment unit 324-$n$, a first processing unit 325-$n$, a second processing unit 326-$n$, and a cancellation processing unit 129-$n$.

Hereinafter, an example in which the "concealed value" is a shared value (a secret sharing value) will be described. The terminal device 11 outputs a query or message which requests processing in accordance with an encryption protocol of secure computation or the like, and the computation devices 32-1 to 32-N perform parallel asynchronous processing in response to this request. M shared values $[a_0], \ldots, [a_{M-1}]$ ($M \geq 1$) are input to the input unit 122-$n$ of the computation device 32-$n$ ($1 \leq n \leq N$) along with the query or message. A shared value $[a_m]$ ($0 \leq m < M$) is a shared value obtained by performing secret sharing on a value $a_m$. The method of secret sharing has to be a secret sharing scheme by which operations of addition, multiplication, the sum of products, and random permutation can be performed in secure computation; however, any secret sharing scheme may be used as long as these operations can be performed thereby. For the details of an applicable secret sharing method, see Non-patent Literature 1. The number M of shared values $[a_0], \ldots, [a_{M-1}]$ which are input is appropriately determined by the description of secure computation.

The input shared values $[a_0], \ldots, [a_{M-1}]$ and query or message are stored in the storage 121-$n$ (Step S122-$n$). By being triggered thereby, the security judgment unit 324-$n$ starts a security judgment as to whether or not the input query or message satisfies a predetermined security level. The security judgment as to whether or not the query which the terminal device 11 has output satisfies a predetermined security level is the same as that of the first embodiment. On the other hand, the security judgment as to whether or not the message which any one of the computation devices 32-1 to 32-N has output satisfies a predetermined security level may be made based on, for example, the verification result (the details thereof will be described later) of a checksum in the computation device that has output the message (Step S3241-$n$).

The security judgment unit 124-$n$ performs monitoring to determine whether the security judgment is completed (Step S1242-$n$). The shared values $[a_0], \ldots, [a_{M-1}]$ are input to the first processing unit 325-$n$, and the first processing unit 325-$n$ executes only "first processing", which does not involve outputting information to a "second external device", of processing based on the query or message (processing which is triggered by the query or message) until it is judged that the above-described security judgment is completed and the query or message satisfies a predetermined security level. The "second external device" is the terminal device 11 or any computation device 32-$m$ ($m \in \{1, \ldots, N\}$ and $m \neq n$). In the present embodiment, the first processing unit 325-$n$ first generates a shared value $[r]$ of a random number $r \in A$ selected from the associative algebra A. The generation of the shared value $[r]$ has to be performed in a state in which the random number $r$ is concealed from all the computation devices 32-1, ..., 32-N. For instance, the computation devices 32-1, ..., 32-N can generate the shared value $[r]$ of the random number $r$ in collaboration with each other. Specifically, first, each computation device 32-$n$ generates a random number $r_n$. Next, the computation device 32-$n$ generates a shared value $[r_n]$ of the random number $r_n$ by the concealment method described in Non-patent Literature 1. Each computation device 32-$n$ calculates $[r] = \Sigma_{n<N}[r_n]$ and obtains the shared value $[r]$ of the random number $r$. Such a configuration makes it possible for each of the computation devices 32-1, ..., 32-N to obtain the shared value $[r]$ of the random number $r$ without knowing the random number $r$. Moreover, if it is possible to permit prior holding of a common random number or use of a pseudo random number, the shared value $[r]$ of the random number $r$ can be generated by using replicated secret sharing. The use of replicated secret sharing makes it possible to generate the shared value $[r]$ of the random number $r$ without communication between the computation devices 32-1, ..., 32-N. For the details of replicated secret sharing, see "R. Cramer, I. Damgard, and Y. Ishai, "Share conversion, pseudorandom secret-sharing and applications to secure computation", TCC, Vol. 3378 of Lecture Notes in Computer Science, pp. 342-362, Springer, 2005. (Reference Literature 1)". Next, the first processing unit 325-$n$ generates randomized concealed values $<a_0>, \ldots, <a_{M-1}>$ by using the shared values $[a_0], \ldots, [a_{M-1}]$ and the shared value $[r]$. For example, the first processing unit 325-$n$ obtains $[a_m r] = [a_m] \times [r]$ for $m = 0, \ldots, M-1$ by the secure computation method described in Non-patent Literature 1 by using the shared value $[a_m]$ and the shared value $[r]$ and generates a randomized concealed value $<a_m> = ([a_m], [a_m r])$ by pairing the shared value $[a_m]$ with the shared value $[a_m r]$. The first processing unit 325-$n$ obtains a concealed function value $[F([a_0], \ldots, [a_{M-1}])]$ by executing a function F including at least one secure computation on the randomized concealed values $<a_0>, \ldots, <a_{M-1}>$. In so doing, the first processing unit 325-$n$ uses a randomized concealed value $<f_i>$, which is an object on which calculation is to be performed and a calculation result depending on the description of secure computation, as an element of a checksum $C := <f_0>, \ldots, <f_{\mu-1}>$. Here, $\mu$ is the number of randomized concealed values included in the checksum C. The value of $\mu$ is subjected to addition every time the checksum C is updated. $f_i$ ($0 \leq i < \mu$) is the function value of an object on which calculation is to be performed (an operand). For example, when secure computation of addition/constant multiplication is performed in the function F, as is the case with addition which is performed on a shared value over a ring R, secure computation of addition/constant multiplication can be executed without communication with another computation device 32-$n$. For instance, on the assumption that each of randomized concealed values $<a>$ and $<b>$ is any one of the randomized concealed values $<a_0>, \ldots, <a_{M-1}>$ or a randomized concealed value obtained from any one of the randomized concealed values $<a_0>, \ldots, <a_{M-1}>$, the first processing unit 325-$n$ calculates a randomized concealed value $<\gamma a + b>$ by the following formula (2) by using $\gamma$ as an arbitrary constant; if an R component $[\gamma a + b]$ of the randomized concealed value $<\gamma a + b>$, which is the calculation result, is included in the function value $[F([a_0], \ldots, [a_{M-1}])]$, the first processing unit 325-$n$ uses the randomized concealed value $<\gamma a+b>$ as an element of the checksum C by a formula (3). In secure computation of addition/constant multiplication, implementation is possible by an operation in the computation device 32-n.

$$<\gamma a+b>:=(\gamma[a]+[b],\gamma[ar]+[br]) \quad (2)$$

$$C:=C\cup<\gamma a+b> \quad (3)$$

The function value $[F([a_0], \ldots, [a_{M-1}])]$ and checksum C thus obtained are output to the second processing unit 326-n (Step S325-n).

If the security judgment unit 324-n judges that the security judgment is completed and the query or message does not satisfy the predetermined security level, the processing in Step S129-n described earlier is executed. On the other hand, if the security judgment unit 324-n judges that the security judgment is completed and the query or message satisfies the predetermined security level (Step S1243-n), the second processing unit 326-n executes "second processing", which involves outputting information (a message or processing result) to the "second external device", of the processing based on the query or message.

The second processing unit 326-n may perform secure computation of multiplication in the function F, for example. Secure computation of multiplication is implemented by multiplication over a ring R and scalar multiplication. For instance, on the assumption that each of randomized concealed values $<a>$ and $<b>$ is any one of the randomized concealed values $<a_0>, \ldots, <a_{M-1}>$ or a randomized concealed value obtained from any one of the randomized concealed values $<a_0>, \ldots, <a_{M-1}>$, the second processing unit 326-n updates the checksum C by the following formula (4) and calculates a randomized concealed value $<ab>$ by a formula (5); if an R component $[ab]$ of the randomized concealed value $<ab>$, which is the calculation result, is included in the function value $[F([a_0], \ldots, [a_{M-1}])]$, the second processing unit 326-n uses the randomized concealed value $<ab>$ as an element of the checksum C by a formula (6).

$$C:=C\cup\{<a>,<b>\} \quad (4)$$

$$<ab>:=([a][b],[a][br]) \quad (5)$$

$$C:=C\cup<ab> \quad (6)$$

In secure computation of multiplication, $[ar]$ which is an A component is not used for the randomized concealed value $<a>$. The calculation result of $[ar][br]$ is $[abr^2]$, resulting in a change in the order of the random number r. In order to avoid this change, in the A component, calculation of $[a][br]=[abr]$ is performed. To multiplication over a ring R, the method described in "R. Gennaro, M. O. Rabin, and T. Rabin, "Simplified vss and fact-track multiparty computations with applications to threshold cryptography", PODC, pp. 101-111, ACM, 1998. (Reference Literature 2)" or "I. Damgard and J. B. Nielsen, "Scalable and unconditionally secure multiparty computation", CRYPTO, Vol. 4622 of Lecture Notes in Computer Science, pp. 572-590, Springer, 2007. (Reference Literature 3)" can be applied. On the assumption that the total number of computation devices 32-n is N and the number of computation devices 32-n required for reconstruction is k, one round with the volume of communications traffic $O(N^2)$ is performed in the method described in Reference Literature 2 and three rounds with the volume of communications traffic $O(N)$ are performed in the method described in Reference Literature 3; thus, the method described in Reference Literature 2 is better in terms of the volume of communications traffic. However, to be more precise, the volume of communications traffic is $N(N-1)$ in the method described in Reference Literature 2 and the volume of communications traffic is $N(N-1)/k+6(N-1)$ in the method described in Reference Literature 3; thus, if N is small, the method described in Reference Literature 2 is sometimes more efficient.

If replicated secret sharing is used, multiplication over the associative algebra A can perform semi-honest multiplication without problems because A is a ring. Moreover, if A is a field, no problem arises even when Shamir secret sharing is used. It is non-trivial if A is not a field when Shamir secret sharing is used; however, it is necessary simply to perform multiplication over R for each component if, for example, A is simply $R^q$. Scalar multiplication is an operation by which $[ab]\in[A]$ is calculated from $[a]\in[R]$ and $[b]\in[A]$. If A is expressed as a q-dimensional vector of R' for a homomorphism R' of a ring of R, scalar multiplication is easily performed. Let a homomorphism of R→R' be equal to h and $[b]=([b_0], \ldots, [b_{q-1}])$. If what is obtained by making h act on the share of each party of $[a]$ is assumed to be $[h(a)]$, $[h(a)]$ belongs to $[R']$ from the homomorphism property. That is, $[ab]:=([h(a)][b_0], \ldots, [h(a)][b_{q-1}])$ holds. Since h is a local operation, the volume of communications traffic is q multiplication over R' (or one multiplication over A) and the number of rounds is 1. A case in which A is an extension field is the simplest case that satisfies this condition. In this case, h can be identity mapping and $[ab]:=([a][b_0], \ldots, [a][b_{q-1}])$ holds.

The second processing unit 326-n may perform secure computation of the sum of products in the function F, for example. Secure computation of the sum of products is implemented by the sum of products over a ring R and the sum of scalar products. Specifically, on the assumption that L is an integer greater than or equal to 2 but less than or to equal to M and each of randomized concealed values $<\alpha_0>, \ldots, <\alpha_{L-1}>$ and $<\beta_0>, \ldots, <\beta_{L-1}>$ is any one of the randomized concealed values $<a_0>, \ldots, <a_{M-1}>$ or a randomized concealed value obtained from any one of the randomized concealed values $<a_0>, \ldots, <a_{M-1}>$, the second processing unit 326-n updates the checksum C by the following formula (7) and calculates a randomized concealed value $<\Sigma_{i<L}\alpha_i\beta_i>$ by a formula (8); if an R component $[\Sigma_{i<L}\alpha_i\beta_i]$ of the randomized concealed value $<\Sigma_{i<L}\alpha_i\beta_i>$, which is the calculation result, is included in the function value $[F([a_0], \ldots, [a_{M-1}])]$, the second processing unit 326-n uses the randomized concealed value $<\Sigma_{i<L}\alpha_i\beta_i>$ as an element of the checksum C by a formula (9).

$$C:=C\cup\{<\alpha_i>\}_{0\le i<L}\cup\{<\beta_i>\}_{0\le i<L} \quad (7)$$

$$<\sum_{i<L}\alpha_i\beta_i>:=\left(\sum_{i<L}[\alpha_i][\beta_i], \sum_{i<L}[\alpha_i][\beta_ir]\right) \quad (8)$$

$$C:=C\cup<\sum_{i<L}\alpha_i\beta_i> \quad (9)$$

The sum of products over a ring R can be implemented by using multiplication over a ring R. The volume of communications traffic of the sum of products over a ring R is the same as the volume of communications traffic of one multiplication over a ring R. The sum of scalar products can be implemented by using scalar multiplication. The volume of communications traffic of the sum of scalar products is the same as the volume of communications traffic of one scalar multiplication. The reason why $[\alpha_ir]$ which is an A component is not used for the randomized concealed value $<\alpha_i>$ is to avoid a change in the order of the random number r for the same reason as that described for the secure computation of multiplication.

The second processing unit 326-$n$ may perform secure computation of random permutation in the function F, for example. The random permutation for a randomized concealed value is processing by which the same random permutation is performed on an R component and an A component of a randomized concealed value. For instance, on the assumption that L is an integer greater than or equal to 2 but less than or equal to M, each of $<\alpha_0>, \ldots, <\alpha_{L-1}>$ is any one of the randomized concealed values $<a_0>, \ldots, <a_{M-1}>$ or a randomized concealed value obtained from any one of the randomized concealed values $<a_0>, \ldots, <a_{M-1}>$, and $\pi$ is mapping into a set of integers, each being greater than or equal to 0 but less than L, the second processing unit 326-$n$ updates the checksum C by the following formula (10) and calculates a randomized concealed value $<\alpha_{\pi(i)}>$ by formulae (11) and (12); if an R component $[\alpha_{\pi(i)}]$ of the randomized concealed value $<\alpha_{\pi(i)}>$, which is the calculation result, is included in the function value $[F([a_0], \ldots, [a_{M-1}])]$, the second processing unit 326-$n$ uses the randomized concealed value $<\alpha_{\pi(i)}>$ as an element of the checksum C by a formula (13).

$$C := C \cup \{<\alpha_i>\}_{0 \le i < L} \quad (10)$$

$$\{([\alpha_{\pi(i)}])\}_{0 \le i < L}, \{([\alpha_{\pi(i)}]r)\}_{0 \le i < L} \text{ is calculated} \quad (11)$$

$$\{<\alpha_{\pi(i)}>\}_{0 \le i < L} := \{([\alpha_{\pi(i)}], [\alpha_{\pi(i)}]r)\}_{0 \le i < L} \quad (12)$$

$$C := C \cup \{<\alpha_{\pi(i)}>\}_{0 \le i < L} \quad (13)$$

To secure computation of random permutation, the method described in "Koki Hamada, Dai Ikarashi, Koji Chida, Katsumi Takahashi, "A Random Permutation Protocol on Three-Party Secure Function Evaluation", CSS2010, 2010. (Reference Literature 4)" can be applied.

The second processing unit 326-$n$ verifies correctness of the function value $[F([a_0], \ldots, [a_{M-1}])]$ by verifying the checksum C by using the shared value $[r]$. Verification of the checksum C is performed based on a shared value $[\varphi]$ obtained by multiplying the sum of shared values $[f_0], \ldots, [f_{\mu-1}]$ included in the checksum C by the shared value $[r]$ and a shared value $[\psi]$ which is the sum of shared values $[f_0 r], \ldots, [f_{\mu-1} r]$ included in the checksum C.

The second processing unit 326-$n$ verifies the checksum C in the following manner, for example. First, the second processing unit 326-$n$ generates shared values $[\rho_0], \ldots, [\rho_{\mu-1}]$ of $\mu$ random numbers $\rho_0, \ldots, \rho_{\mu-1}$ over the associative algebra A. The generation of the shared values $[\rho_0], \ldots, [\rho_{\mu-1}]$ has to be performed in a state in which the random numbers $\rho_0, \ldots, \rho_{\mu-1}$ are concealed from any computation device 32-$n$. The generation of the shared values $[\rho_0], \ldots, [\rho_{\mu-1}]$ may be performed by a method similar to the above-described method of generation of the shared value $[r]$.

Next, the second processing unit 326-$n$ obtains a shared value $[\varphi]$ by the following formula (14) by using the shared values $[f_0], \ldots, [f_{\mu-1}]$ included in the checksum C, the shared values $[\rho_0], \ldots, [\rho_{\mu-1}]$, and the shared value $[r]$.

$$[\varphi] := \left(\sum_{i<\mu} [f_i][\rho_i]\right)[r] \quad (14)$$

Moreover, the second processing unit 326-$n$ obtains a shared value $[\psi]$ by the following formula (15) by using the shared values $[f_0 r], \ldots, [f_{\mu-1} r]$ included in the checksum C and the shared values $[\rho_0], \ldots, [\rho_{\mu-1}]$.

$$[\Psi] := \sum_{i<\mu} [f_i r][\rho_i] \quad (15)$$

Next, the second processing unit 326-$n$ reconstructs a shared value $[\delta]=[\varphi]-[\psi]$, which is obtained by subtracting the shared value $[\psi]$ from the shared value $[\varphi]$. A method of reconstruction may be performed by a reconstruction operation of a secret sharing scheme corresponding to each shared value; in so doing, correctness is ensured in the malicious model. Specifically, each of the second processing units 326-1, . . . , 326-N of all the computation devices 32-1, . . . , 32-N sends the shared value $[\delta]$ to the second processing units of the other computation devices and checks consistency of the shared value, whereby absolute correctness is ensured. In this case, if the total number of computation devices 32-$n$ is N and the number of computation devices 32-$n$ required for reconstruction is k, the total volume of communications traffic is N(N−1). If a probabilistic method is used, the total volume of communications traffic can be N(k−1) when the amount of data of the shared value is large. Incidentally, like the secure computation described in the Reference Literature 3 described earlier, there is semi-honest computation including reconstruction whose correctness is not ensured; however, even when reconstruction whose correctness is not ensured is included as a configuration element of secure computation, the security of secure computation as a whole is not affected.

If the values $\delta$ reconstructed in all the computation devices 32-1, . . . , 32-N are 0, the second processing unit 326-$n$ determines that no falsification has been made throughout the secure computation. If the value $\delta$ reconstructed in any one of the computation devices 32-1, . . . , 32-N is a value other than 0, the second processing unit 326-$n$ determines that falsification has been made in the secure computation. If the second processing unit 326-$n$ determines that no falsification has been made as a result of verification of the checksum C, the second processing unit 326-$n$ outputs the function value $[F([a_0], \ldots, [a_{M-1}])]$ to the output unit 123-$n$. If the second processing unit 326-$n$ determines that falsification has been made, the second processing unit 326-$n$ outputs information (for example, "⊥") to that effect to the output unit 123-$n$. The output unit 123-$n$ outputs the function value $[F([a_0], \ldots, [a_{M-1}])]$ input thereto when a determination was made that no falsification had been made or information to the effect that a determination was made that falsification had been made (Step S326-$n$).

The function value $[F([a_0], \ldots, [a_{M-1}])]$ obtained when a determination was made that no falsification had been made or information to the effect that a determination was made that falsification had been made, that is, information indicating the verification result of the checksum C may be sent to any other computation device 32-$j'$ ($j' \in \{1, \ldots, N\}$) as part of a message (a processing request). In this case, the message including the information indicating the verification result of the checksum C may be input to an input unit 1224 of the computation device 32-$j'$ (Step S122-$j'$), a security judgment unit 324-$j'$ may make a security judgment by using the information indicating the verification result of the checksum C (Step S3241-$j'$), and then processing in Steps S1242-j', S325-j', S1243-j', S129-j', and, S326-j' may be performed. That is, the input unit 1224 of the computation device 32-j' accepts a third processing request output from the computation device 32-n, and the security judgment unit 324-j' judges whether the third processing request satisfies a predetermined second security level. The security judgment unit 324-j' judges whether the third processing request satisfies the second security level based on at least the verification result of the checksum C. A first processing unit 3254 executes third processing, which does not involve outputting information to a third external device, of processing based on the third processing request until the third processing request is judged to satisfy the second security level. The "third external device" is the terminal device 11 or any computation device 32-j'' (j''∈{1, ..., N} and j''≠j'). After the third processing request is judged to satisfy the second security level, a second processing unit 326-j' executes fourth processing, which involves outputting information to the third external device, of the processing based on the third processing request. Here, μ' is an integer greater than or equal to 1 and i' is an integer which satisfies 0≤i'<μ'. The third processing includes processing by which, by using a concealed value [r'] of a random number r' and a concealed value [$f_i'$] of a function value $f_i'$ of second operand information, a concealed value [$f_i'r'$] of a product $f_i'r'$ of the function value $f_i'$ and the random number r' is obtained and a checksum C':=<$f_0'$>, ..., <$f_{μ-1}'$> including a randomized concealed value <$f_i'$> obtained by pairing the concealed value [$f_i'$] with the concealed value [$f_i'r'$] is obtained. The fourth processing includes processing by which the checksum C' is verified based on a concealed value [φ'] obtained by multiplying the sum of the values of the concealed value [$f_i'$] by the concealed value [r'] and a concealed value [ψ'] which is the sum of the values of the concealed value [$f_i'r'$] included in the checksum C'.

Moreover, unlike the case in which a message including the information indicating the verification result of the checksum C is sent to the computation device 32-j', a message which does not include the information indicating the verification result of the checksum C may be input to the input unit 1224 of the computation device 32-j' before the completion of verification of the checksum C in the security judgment unit 324-n and the processing in the first processing unit 3254 of the computation device 32-j' may be performed first. When verification of the checksum C in the security judgment unit 324-n is completed, a message including the information indicating the verification result of the checksum C may be input to the input unit 122-j' of the computation device 32-j', the security judgment unit 324-j' may make a security judgment by using the information indicating the verification result of the checksum C (Step S3241-j'), and then the processing in Steps S1242-j', S325-j', S1243-j', S129-j', and S326-j' may be performed. That is, the computation device 32-n outputs the third processing request before the completion of verification of the checksum C, and the first processing unit 3254 executes the third processing before the completion of verification of the checksum C.

A basic concept of correctness verification will be described. Verification of a checksum is verifying whether [$f_i$][r]−[$f_ir$]=0 with attention being focused on each randomized concealed value. Here, assume that both the shared value [$f_i$] and the shared value [$f_ir$] are falsified and turned into [$f_i$+x] and [$f_ir$+y]. Then, a value obtained by verification is indicated in a formula (16).

$$[f_i+x][r]-[f_ir+y]=[xr-y] \quad (16)$$

An attacker has to manipulate [$f_i$] and [$f_ir$] skillfully so that the value of xr−y becomes 0, but, since the attacker does not know the random number r∈A, the probability that the attacker can manipulate [$f_i$] and [$f_ir$] so that the value of xr−y becomes 0 is 1/|A|. In this embodiment, however, multiplication by random numbers $ρ_0, ..., ρ_{μ-1}$ makes the falsification success probability as a whole 2/|A| at most.

Fourth Embodiment

In computation in accordance with a secure computation protocol, more computation devices (parties) communicate with each other as compared to an existing encryption protocol. These computations are executed by combinations of a plurality of lower-order protocols (lower-order processing modules and communication between the processing modules) and, in some instances, performed by up to thousands of combinations of lower-order protocols involving communication. If processing of such lower-order protocols is performed in a serial manner, communication in thousands of stages is required. Thus, in a secure computation technology, execution of asynchronous parallel processing for enhancing the speed by reducing the number of stages of communication is further required as compared to the existing encryption protocol (Requirement 1).

However, because of a large number of lower-order protocols, and, in order to make use of the feature of secure computation that allows various higher-order protocols (higher-order processing modules and communication between the processing modules) to be arbitrarily configured from the lower-order protocols, it is not preferable that, every time individual processing is set in the secure computation technology, a person designs the procedure (schedule) of asynchronous parallel processing of the processing. Thus, a device is required to perform asynchronous parallel processing scheduling automatically at high speed for an arbitrary combination of lower-order protocols which implements arbitrary processing (Requirement 2).

Furthermore, since the secure computation protocol is also an encryption protocol, the secure computation protocol has to be secure. Specifically, there are two conditions. A first condition is that it is desirable that a plurality of computation devices, which often have a pseudo random number in common in the secure computation protocol, have a pseudo random number in common without performing communication to reduce the volume of communications traffic. It is necessary for such pseudo random numbers not to correlate with each other (to be different from each other, for example) between different types of processing and to be identical with each other between a plurality of computation devices that perform the same processing (Requirement 3).

A second condition is that "processing that is not identified as processing which is allowed to be performed is not performed". It is difficult to satisfy this condition in two points. Firstly, since the number of lower-order protocols is large and, in order to make it possible to configure various higher-order protocols from the lower-order protocols, it is not appropriate to set an individual verification logic for each description of processing as in the case of the asynchronous parallel processing scheduling. That is, it is necessary to check whether "processing is allowed to be performed" by versatile verification (Requirement 4). Secondly, in common asynchronous parallel processing which is not an encryption protocol, describing data to be processed and an instruction in communication data allows a receiving side to execute processing in a state in which the receiving side knows nothing. However, in the encryption protocol based on the premise that other computation devices are not reliable, it is not appropriate to follow at all times an instruction of communication data sent from another computation device. In addition, when the lower-order protocols operate in an asynchronous and parallel manner, there is a case in which communication of communication data required for execution of a verification logic was performed in an early stage and such communication data arrived at a computation device that executes the verification logic, but the computation device have not yet reached a verification logic execution stage. Therefore, special processing, such as storage and retrieval, by which the communication data received by the computation device is temporarily stored and the communication data is retrieved when the verification logic is executed is required (Requirement 5). The present embodiment proposes a method which fulfills these Requirements 1 to 5.

<Configuration>

As illustrated in FIG. 1, a computation system 4 of the present embodiment includes a terminal device 11 and N computation devices 42-1 to 42-N, which are configured so as to be capable of communicating with each other via a network 13 which is not secure. As illustrated in FIG. 2, a computation device 42-$n$ ($n \in \{1, \ldots, N\}$) of the present embodiment includes a storage 121-$n$, an input unit 122-$n$, an output unit 123-$n$, a security judgment unit 424-$n$, a first processing unit 425-$n$, a second processing unit 426-$n$, and a cancellation processing unit 129-$n$.

<Preprocessing>

As preprocessing, the first processing units 425-1, ..., 425-N of the computation devices 42-1, ..., 42-N have a seed of a pseudo random number in common. The seed of a pseudo random number was generated outside the computation system 4 by use of, for example, a random number generation protocol. By inputting this seed and an initial vector to a pseudo random number generation algorithm, a pseudo random number corresponding to a combination of the seed and the initial vector is generated.

Moreover, a first identifier indicating the description of an instruction by a query or message (processing request) is determined in advance. When the description of an instruction is identified, a first identifier indicating the description of an instruction is also uniquely determined. That is, there is a one-to-one correspondence between the description of an instruction and the first identifier. Furthermore, a second identifier indicating an atomic protocol (basic processing) configuring a protocol (processing) based on a query or message (processing request) is also determined in advance. The atomic protocol means a protocol whose lower-order protocol does not exist. That is, the atomic protocol is executed without referring to another lower-order protocol. When an atomic protocol is identified, a second identifier indicating the atomic protocol is also uniquely determined. That is, there is a one-to-one correspondence between the atomic protocol and the second identifier. Lower-order protocols that implement each processing (a higher-order protocol) based on a query or message and the order of execution thereof are also set in advance or kept in a state in which the lower-order protocols and the order of execution thereof can be uniquely determined by a deterministic algorithm.

<Processing>

In the present embodiment, the terminal device 11 and the computation devices 42-1 to 42-N execute processing in an asynchronous and parallel manner as described above, and the atomic protocols configuring the processing also operate in an asynchronous and parallel manner. When any computation device 42-$j'$ ($j' \in \{1, \ldots, N\}$) outputs each communication data of each atomic protocol configuring processing (a higher-order protocol) based on a predetermined query or message, a first processing unit 425-$j'$ sets a first identifier IDa (an identifier IDa indicating the description of an instruction by a first processing request) indicating the description of an instruction by the query or message, a second identifier IDb (an identifier IDb indicating basic processing configuring processing based on the first processing request) indicating each atomic protocol configuring processing based on the query or message, and a third identifier IDc (an identifier IDc corresponding to the description of processing which is performed in a predetermined order in basic processing in which the communication data is communicated) corresponding to the description of processing which is performed in a predetermined order by an atomic protocol in which the communication data is communicated.

As described above, since the first identifier corresponding to the description of an instruction is determined in advance, the first processing unit 425-$j'$ can uniquely identify the first identifier IDa corresponding to the description of an instruction by a query or message. Since the second identifier indicating each atomic protocol is also determined in advance and the lower-order protocols that implement each processing (a higher-order protocol) based on a query or message and the order of execution thereof can also be determined serially and uniquely, the first processing unit 425-$j'$ can also uniquely identify the second identifier IDb of each atomic protocol configuring the processing. Since the order of processing (serial processing) which is executed by each atomic protocol is also determined in advance, if a value (for instance, consecutive numbers indicating an order, a function value of an order, an injective mapping of an order, or the like) which is in a one-to-one correspondence with the order of processing which is executed by each atomic protocol is used as a third identifier, the third identifier IDc is also uniquely determined. That is, the first processing unit 425-$j'$ can set ID=[IDa, IDb, IDc] without communicating with the outside. One set of IDs [IDa, IDb, IDc] is generated for each description of processing which is performed by each atomic protocol in which communication data is communicated. That is, each set of IDs [IDa, IDb, IDc] corresponds to each description of processing of an atomic protocol in which the above-described communication data is communicated.

The first processing unit 425-$j'$ outputs communication data (for example, communication data including [IDa, IDb, IDc] in the header) including the set of IDs [IDa, IDb, IDc] thus set. The communication data including the set of IDs [IDa, IDb, IDc] is output from an output unit 123-$j'$ and sent to the computation device 42-$n$ ($n \in \{1, \ldots, N\}$). The communication data including the set of IDs [IDa, IDb, IDc] is input to the input unit 122-$n$ of the computation device 42-$n$ and stored in the storage 121-$n$. This communication data is also used for a judgment as to whether or not a query or message corresponding thereto satisfies a first security level.

When any computation device 42-$j$ ($j \in \{1, \ldots, N\}$) outputs a predetermined query or message and the query or message is sent to the computation device 42-$n$, the query or message (the first processing request) is input to the input unit 122-$n$ (Step S122-$n$) and sent to the security judgment unit 424-$n$. By being triggered thereby, the security judgment unit 424-$n$ starts a security judgment as to whether or not the input query or message satisfies a predetermined security level (Step S4241-$n$). First, the security judgment unit 424-$n$ generates an identifier IDa' indicating the description of an instruction by the query or message, an identifier IDb' indicating each atomic protocol (basic processing) configuring processing based on the query or message, and an identifier IDc' corresponding to the description of processing which is performed by each atomic protocol in a predetermined order, generates meta data meta [IDa', IDb', IDc'] including ID'=[IDa', IDb', IDc'], and stores the meta data meta [IDa', IDb', IDc'] in the storage 121-$n$. Furthermore, the meta data may include, for example, information on a format which is used in an atomic protocol. The security judgment unit 424-$n$ identifies ID'=[IDa', IDb', IDc'] in a serial manner in accordance with the processing with the description of an instruction by the query or message. After the query or message is input to the input unit 122-$n$, the security judgment unit 424-$n$ can generate [IDa', IDb', IDc'] without communicating with the outside as in the case of [IDa, IDb, IDc]. One set of IDs [IDa', IDb', IDc'] is generated for each description of processing which is performed by each atomic protocol configuring processing based on the query or message. That is, each set of IDs [IDa', IDb', IDc'] corresponds to each description of processing which is performed by each atomic protocol configuring processing based on the query or message. The other elements of the meta data meta [IDa', IDb', IDc'] are also known, and the security judgment unit 424-$n$ can set the meta data meta [IDa', IDb', IDc'] without communicating with the outside. The security judgment unit 424-$n$ stores the meta data meta [IDa', IDb', IDc'] in the storage 121-$n$. Incidentally, since the computation devices 32-1 to 32-N perform parallel asynchronous processing, when the meta data meta [IDa', IDb', IDc'] is stored in the storage 121-$n$, all of the communication data including [IDa, IDb, IDc] are sometimes not stored in the storage 121-$n$. That is, when the meta data meta [IDa', IDb', IDc'] is stored in the storage 121-$n$, any one of the communication data including [IDa, IDb, IDc] is sometimes stored therein or the communication data including [IDa, IDb, IDc] is sometimes not stored therein at all.

By using each set of IDs [IDa', IDb', IDc'] of the meta data meta [IDa', IDb', IDc'] as an index, the security judgment unit 424-$n$ retrieves, from the storage 121-$n$, communication data including a set of IDs [IDa, IDb, IDc] which coincides with the set of IDs [IDa', IDb', IDc']. If a set of IDs [IDa, IDb, IDc] which coincides with each of all the sets of IDs [IDa', IDb', IDc'] of the meta data meta [IDa', IDb', IDc'] is not detected, the security judgment is not completed (Step S1242-$n$). In this case, the first processing unit 425-$n$ executes only "first processing", which does not involve outputting information to a "second external device", of processing based on the query or message until the query or message is judged to satisfy the predetermined security level. The "first processing" may be the processing illustrated in the first embodiment, and, by using any set of IDs [IDa', IDb', IDc'] as an initial vector, the first processing unit 425-$n$ inputs the initial vector and the above-described seed of a pseudo random number to the pseudo random number generation algorithm and thereby generates a pseudo random number corresponding thereto. Another communication is not required for the generation of this pseudo random number. Likewise, a first processing unit 425-$j$ of the computation device 42-$j$ that has sent a message including a set of IDs [IDa, IDb, IDc] which coincides with the above set of IDs [IDa', IDb', IDc'] can also generate the same pseudo random number by using the set of IDs [IDa, IDb, IDc] as an initial vector and inputting the initial vector and the above-described seed of a pseudo random number to the pseudo random number generation algorithm. That is, for each description of processing of an atomic protocol in which communication data is communicated, the computation device 42-$j$ and the computation device 42-$n$ can generate the same pseudo random number. As described above, the first processing unit 425-$n$ and any other computation device 42-$j$ ($j \in \{1, \ldots, N\}$) are allowed to have a pseudo random number in common by using information including IDa', IDb', and IDc'. Since [IDa', IDb', IDc'] and [IDa, IDb, IDc] can be calculated without communication, the computation device 42-$j$ and the computation device 42-$n$ are allowed to have a pseudo random number in common without performing special communication. In addition, the first processing unit 425-$n$ may execute processing corresponding to a query or message by using the communication data including a set of IDs [IDa, IDb, IDc] which coincides with a set of IDs [IDa', IDb', IDc']. However, processing which is executed by the first processing unit 425-$n$ is limited to processing which does not involve communication with the outside. Since each processing is asynchronous parallel processing, each lower-order protocol is set as processing (handler) which automatically is started by an event of inputting to a still-lower-order protocol or internal processing (Step S425-$n$).

If a set of IDs [IDa, IDb, IDc] which coincides with each of all the sets of IDs [IDa', IDb', IDc'] of the meta data meta [IDa', IDb', IDc'] is detected, the security judgment unit 424-$n$ makes a judgment (a security judgment) as to whether the query or message satisfies the predetermined security level by using the communication data corresponding to the detected set of IDs [IDa, IDb, IDc]. In the present embodiment, if the meta data meta [IDa', IDb', IDc'] includes information on a format which is used in an atomic protocol, the security judgment unit 424-$n$ verifies whether the communication data including a set of IDs [IDa, IDb, IDc] which coincides with a set of IDs [IDa', IDb', IDc'] follows the format. For instance, if the communication data including a set of IDs [IDa, IDb, IDc] which coincides with each of all the sets of IDs [IDa', IDb', IDc'] of the meta data meta [IDa', IDb', IDc'] follows the format, the security judgment unit 424-$n$ judges that the query or message satisfies the predetermined security level. This judgment depends only on the design of the atomic protocol. After the security judgment unit 424-$n$ judges that the query or message satisfies the predetermined security level (Step S1243-$n$), the second processing unit 426-$n$ executes "second processing", which involves outputting information to the "second external device", of the processing based on the query or message. For example, the second processing unit 426-$n$ may execute processing in accordance with the query or message by using the communication data including a set of IDs [IDa, IDb, IDc] which coincides with a set of IDs [IDa', IDb', IDc']. Also in this case, since each processing is asynchronous parallel processing, each lower-order protocol is set as handler which automatically is started by an event of inputting to a still-lower-order protocol or internal processing (Step S426-$n$). If the security judgment unit 424-$n$ judges that the query or message does not satisfy the predetermined security level, the cancellation processing unit 129-$n$ cancels internal processing (for example, the "first processing"), in the computation device 42-$n$, which is based on the query or message input in Step S122-$n$ (for instance, cancels the common pseudo random number) (Step S129-$n$).

Feature of the Present Embodiment

The handler is started, not by the serially previous processing, but by an input to each lower-order protocol or internal processing. Thus, in the present embodiment, asynchronous parallel processing can be implemented. Moreover, by adopting handler startup which depends only on an input and the design of an atomic protocol (which handler is started by which input as an event), it is possible to perform, automatically and at high speed, asynchronous parallel processing scheduling which does not depend on individual designs of higher-order protocols. It is possible to allow the lower-order protocols to have an identifier corresponding to the description of processing in common without performing special communication. As a result, even when the order of the arrival of a query or message and the arrival of communication data required for processing based thereon is changed, it is possible to determine how to deal with such a situation by using the identifier and perform processing properly. Furthermore, by generating a pseudo random number by using this identifier as an initial vector, it is possible to allow the computation devices to have a pseudo random number in common without performing special communication. It is also possible to adopt a security judgment which depends only on the design of an atomic protocol.

Modification of the Fourth Embodiment

In the method of the fourth embodiment, only first processing (for instance, the generation of a pseudo random number) is started first, which undesirably results in an increase in the storage capacity for storing the results obtained by the first processing. To solve this problem, a configuration may be adopted in which, until a protocol in a certain stage is completed, first processing which is performed in and after a predetermined step after that stage is not executed. Moreover, as for a plurality of serial processing which do not depend on each other, additional IDd and IDd' may be generated for each serial processing by a deterministic algorithm on which the computation devices have reached an agreement, so that ID=[IDa, IDb, IDc, IDd] in place of ID=[IDa, IDb, IDc] and ID'=[IDa', IDb', IDc', IDd'] in place of ID'=[IDa', IDb', IDc']. This makes it also possible to execute a plurality of serial processing which do not depend on each other in a parallel way.

Other Modifications

It is to be noted that the present invention is not limited to the embodiments described above. For example, a computation system may include a computation device, a second external device (another computation device), and α first external devices (still other computation devices), and α "first processing requests" may be output from the α first external devices. The "first processing requests" each include a shared value in accordance with a secret sharing scheme. This secret sharing scheme is a scheme (a threshold secret sharing scheme) by which a reconstructed value can be reconstructed from β or more shared values, but a reconstructed value cannot be reconstructed from less than β shared values. Moreover, α is an integer greater than or equal to 3, and β is an integer greater than or equal to 2 but less than α. An "input unit" of the computation device may accept the α "first processing requests" output from the "first external devices", and a "first security judgment unit" of the "computation device" may judge whether β or more first processing requests of the α first processing requests satisfy a predetermined first security level. In this case, a "first processing unit" executes "first processing", which does not involve outputting information to the "second external device", of processing based on the "first processing requests" until β or more first processing requests are judged to satisfy the first security level. After β or more "first processing requests" are judged to satisfy the "first security level", a "second processing unit" executes "second processing", which involves outputting information to the "second external device", of the processing based on the "first processing requests". In this secret sharing scheme, since a reconstructed value can be reconstructed from β or more shared values, when β or more first processing requests are judged to satisfy the first security level, the "second processing" can be executed by using β or more shared values included in the first processing requests judged to satisfy the first security level. This makes it possible to enhance the speed of processing as compared to a case in which the "second processing" is executed after all the first processing requests are judged to satisfy the first security level.

For example, instead of making each device exchange information via a network, at least some sets of devices may exchange information via a portable recording medium. Alternatively, at least some sets of devices may exchange information via a non-portable recording medium. That is, a combination of some of these devices may physically be the same device. Moreover, N may be equal to 1 depending on the intended use.

The above-described various kinds of processing may be executed, in addition to being executed in chronological order in accordance with the descriptions, in parallel or individually depending on the processing power of a device that executes the processing or when needed. In addition, it goes without saying that changes may be made as appropriate without departing from the spirit of the present invention.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the recording device medium and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

In the above-described embodiments, processing functions of the present device are implemented as a result of a predetermined program being executed on the computer, but at least part of these processing functions may be implemented by hardware.

INDUSTRIAL APPLICABILITY

The above-described technology can be applied to, for example, parallel asynchronous processing (such as distributed computation in secure computation) by cloud computing, update processing of an encryption database, and anonymous communication.

DESCRIPTION OF REFERENCE NUMERALS 1, 2, 3, 4 computation system
12-$n$, 22-$n$, 32-$n$, 42-$n$ computation device

What is claimed is:

1. A computation system that includes a plurality of computation devices which perform information processing, wherein
the plurality of computation devices include a first computation device, a second computation device, and a third computation device, and
the first computation device includes processing circuitry configured to implement
an input unit that accepts a first processing request output from the second computation device,
a first security judgment unit that judges whether the first processing request satisfies a predetermined first security level,
a first processing unit that executes first processing, which does not involve outputting information to the third computation device, of processing based on the first processing request until the first processing request is judged to satisfy the first security level, and
a second processing unit that executes second processing, which involves outputting information to the third computation device, of the processing based on the first processing request after the first processing request is judged to satisfy the first security level, wherein
the first computation device includes a cancellation processing unit that does not output, even when an error occurs in the first processing, a second processing request which requests cancellation of the processing performed by the second computation device until the first processing request is judged to satisfy the first security level, and that outputs, after an error occurs in the first processing and the first processing request is judged to satisfy the first security level, the second processing request to the second computation device.

2. A computation system that includes a plurality of computation devices which perform information processing, wherein
the plurality of computation devices include a first computation device, a second computation device, and a third computation device, and
the first computation device includes processing circuitry configured to implement an input unit that accepts a first processing request output from the second computation device,
a first security judgment unit that judges whether the first processing request satisfies a predetermined first security level,
a first processing unit that executes first processing, which does not involve outputting information to the third computation device, of processing based on the first processing request until the first processing request is judged to satisfy the first security level, and
a second processing unit that executes second processing, which involves outputting information to the third computation device, of the processing based on the first processing request after the first processing request is judged to satisfy the first security level,
wherein $\mu$ is an integer greater than or equal to 1 and i is an integer which satisfies $0 \le i < \mu$, the first processing includes processing which uses a concealed value $[r]$ of a random number $r$ and a concealed value $[f_i]$ of a function value $f_i$ of operand information to obtain a concealed value $[f_i r]$ of a product $f_i r$ of the function value $f_i$ and the random number $r$ and a checksum $C := \langle f_0 \rangle, \ldots, \langle f_{\mu-1} \rangle$ including a randomized concealed value $\langle f_i \rangle$ obtained by pairing the concealed value $[f_i]$ with the concealed value $[f_i r]$, and
the second processing includes processing which verifies the checksum $C$ based on a concealed value $[\varphi]$ obtained by multiplying a sum of values of the concealed value $[f_i]$ by the concealed value $[r]$ and a concealed value $[\psi]$ which is a sum of values of the concealed value $[f_i r]$ included in the checksum $C$.

3. The computation system according to claim 2, wherein the plurality of computation devices include a fourth computation device, $\mu'$ is an integer greater than or equal to 1 and i' is an integer which satisfies $0 \le i' < \mu'$, the fourth computation device includes
a second input unit that accepts a third processing request output from the first computation device,
a second security judgment unit that judges whether the third processing request satisfies a predetermined second security level,
a third processing unit that executes third processing, which does not involve outputting information to the third computation device, of processing based on the third processing request until the third processing request is judged to satisfy the second security level, and
a fourth processing unit that executes fourth processing, which involves outputting information to the third computation device, of the processing based on the third processing request after the third processing request is judged to satisfy the second security level,
the third processing includes processing which uses a concealed value $[r']$ of a random number $r'$ and a concealed value $[f_i']$ of a function value $f_i'$ of second operand information to obtain a concealed value $[f_i' r']$ of a product $f_i' r'$ of the function value $f_i'$ and the random number $r'$ and a checksum $C' := \langle f_0' \rangle, \ldots, \langle f_{\mu-1}' \rangle$ including a randomized concealed value $\langle f_i' \rangle$ obtained by pairing the concealed value $[f_i']$ with the concealed value $[f_i' r']$,
the fourth processing includes processing which verifies the checksum $C'$ based on a concealed value $[\varphi']$ obtained by multiplying a sum of values of the concealed value $[f_i']$ by the concealed value $[r']$ and a concealed value $[\psi']$ which is a sum of values of the concealed value [f_i'r''] included in the checksum C', and the second security judgment unit judges whether the third processing request satisfies the second security level based on at least a verification result of the checksum C.

4. The computation system according to claim 3, wherein the first computation device outputs the third processing request before completion of verification of the checksum C, and the third processing unit executes the third processing before completion of verification of the checksum C.

5. A computation system that includes a plurality of computation devices which perform information processing, wherein the plurality of computation devices include a first computation device, a second computation device, and α third computation devices, α being an integer greater than or equal to 3 and β being an integer greater than or equal to 2 but less than α, the first computation device includes processing circuitry configured to implement an input unit that accepts a first processing requests output from the third computation devices, a first security judgment unit that judges whether β or more first processing requests of the α first processing requests satisfy a predetermined first security level, a first processing unit that executes first processing, which does not involve outputting information to the second computation device, of processing based on the first processing requests until β or more first processing requests of the α first processing requests are judged to satisfy the first security level, and a second processing unit that executes second processing, which involves outputting information to the second computation device, of the processing based on the first processing requests after β or more first processing requests of the α first processing requests are judged to satisfy the first security level, the first processing requests each include a shared value in accordance with a secret sharing scheme, and the secret sharing scheme is a scheme by which a reconstructed value can be reconstructed from β or more shared values of the shared values, but a reconstructed value cannot be reconstructed from less than β shared values of the shared values.

6. A computation system that includes a plurality of computation devices which perform information processing, wherein the plurality of computation devices include a first computation device, a second computation device, and a third computation device, the first computation device includes processing circuitry configured to implement an input unit that accepts a first processing request output from the second computation device and communication data, which was output from the third computation device, for judging whether the first processing request satisfies a predetermined first security level, a first security judgment unit that judges whether the first processing request satisfies the first security level, a first processing unit that executes first processing, which does not involve outputting information to an outside, of processing based on the first processing request until the first processing request is judged to satisfy the first security level, and a second processing unit that executes second processing, which involves outputting information to the outside, of the processing based on the first processing request after the first processing request is judged to satisfy the first security level, the communication data includes an identifier IDa indicating a description of an instruction by the first processing request, an identifier IDb indicating basic processing configuring the processing based on the first processing request, and an identifier IDc corresponding to a description of processing which is performed in the basic processing, in which the communication data is communicated, in a predetermined order, and the first security judgment unit generates, when the first processing request is input to the input unit, an identifier IDa' indicating a description of an instruction by the first processing request, an identifier IDb' indicating each of the basic processing configuring the processing based on the first processing request, and an identifier IDc' corresponding to a description of processing which is performed in each of the basic processing in a predetermined order, identifies the communication data by using the generated identifiers IDa', 1Db', and IDc', and judges whether the first processing request satisfies the first security level, wherein the first processing includes processing by which the first computation device and at least one of the second computation device and the third computation device have a pseudo random number in common by using information including the identifiers IDa', IDb', and IDc'.

7. A first computation device comprising processing circuitry configured to implement:

an input unit that accepts a first processing request output from a second computation device;

a first security judgment unit that judges whether the first processing request satisfies a predetermined first security level;

a first processing unit that executes first processing, which does not involve outputting information to a third computation device, of processing based on the first processing request until the first processing request is judged to satisfy the first security level; and a second processing unit that executes second processing, which involves outputting information to the third computation device, of the processing based on the first processing request after the first processing request is judged to satisfy the first security level, wherein the first computation device includes a cancellation processing unit that does not output, even when an error occurs in the first processing, a second processing request which requests cancellation of the processing performed by the second computation device until the first processing request is judged to satisfy the first security level, and that outputs, after an error occurs in the first processing and the first processing request is judged to satisfy the first security level, the second processing request to the second computation device.

8. A computation method of a first computation device, the computation method comprising:

an input step of accepting a first processing request output from a second computation device;

a first security judgment step of judging whether the first processing request satisfies a predetermined first security level, a first processing step of executing first processing, which does not involve outputting information to a third computation device, of processing based on the first processing request until the first processing request is judged to satisfy the first security level; and a second processing step of executing second processing, which involves outputting information to the third computation device, of the processing based on the first processing request after the first processing request is judged to satisfy the first security level, wherein the first computation device includes a cancellation processing unit that does not output, even when an error occurs in the first processing, a second processing request which requests cancellation of the processing performed by the second computation device until the first processing request is judged to satisfy the first security level, and that outputs, after an error occurs in the first processing and the first processing request is judged to satisfy the first security level, the second processing request to the second computation device.

9. A non-transitory computer-readable recording medium storing a program for making a computer function as a first computation device, comprising processing circuitry configured to implement:

an input unit that accepts a first processing request output from a second computation device;

a first security judgement unit that judges whether the first processing request satisfies a predetermined first security level;

a first processing unit that executes first processing, which does not involve outputting information to a third computation device, of processing based on the first processing request until the first processing request is judged to satisfy the first security level, and a second processing unit that executes second processing, which involves outputting information to the third computation device, of the processing based on the first processing request after the first processing request is judged to satisfy the first security level, wherein the first computation device includes a cancellation processing unit that does not output, even when an error occurs in the first processing, a second processing request which requests cancellation of the processing performed by the second computation device until the first processing request is judged to satisfy the first security level, and that outputs, after an error occurs in the first processing and the first processing request is judged to satisfy the first security level, the second processing request to the second computation device.

* * * * *